Patented Mar. 3, 1953

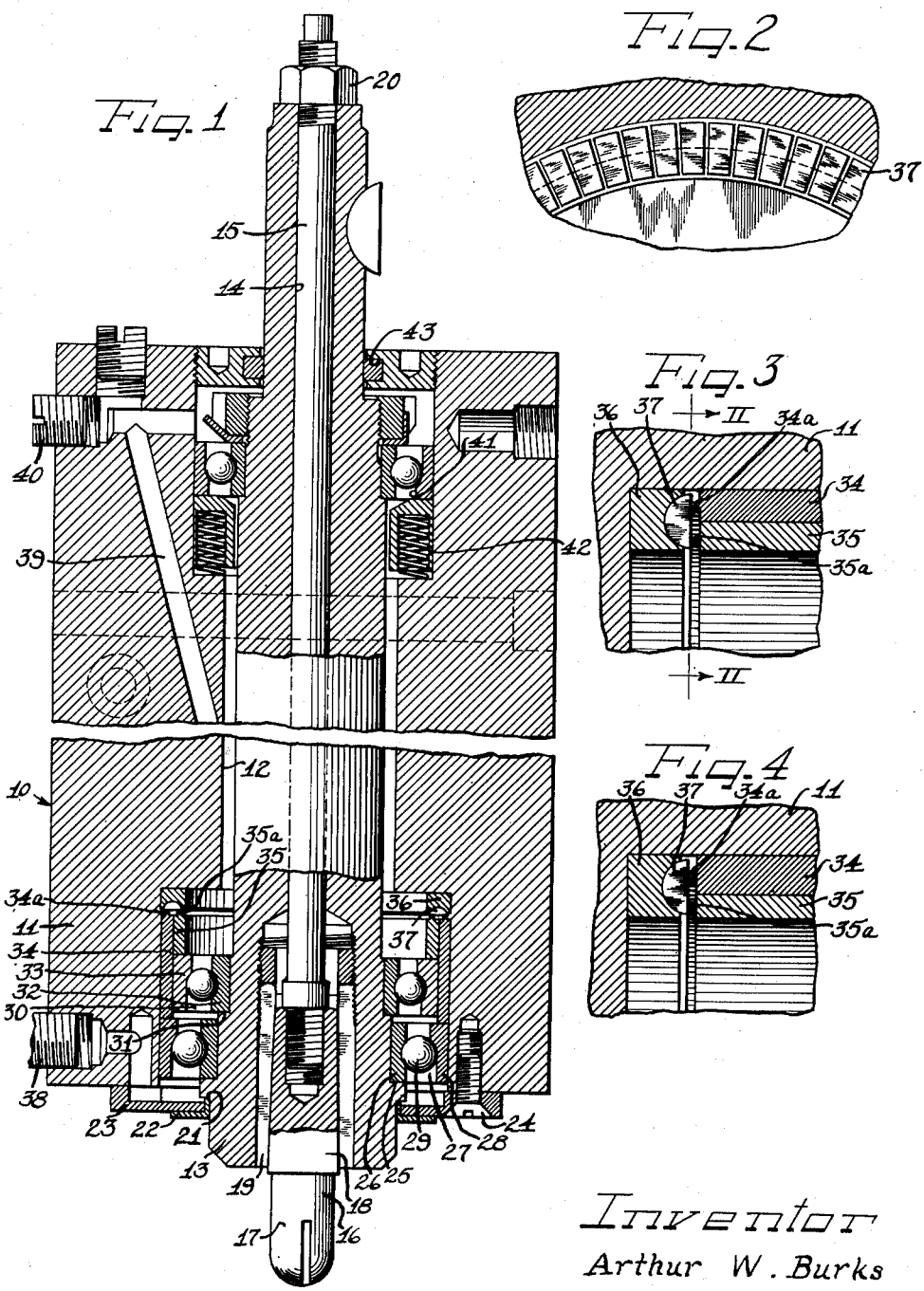

2,630,354

UNITED STATES PATENT OFFICE 2,630,354

LOAD EQUALIZING DEVICE FOR THRUST BEARINGS

Arthur W. Burks, Decatur, Ill., assignor to Decatur Pump Company, Decatur, Ill., a corporation of Illinois Application July 6, 1950, Serial No. 172,233

1 Claim. (Cl. 308—160)

The present invention relates to a load equalizing device for thrust bearings, and more particularly to means for individually apportioning the total thrust load imposed on the plurality of bearings.

In various environments, as in machine tools and the like, the thrust load imposed on a rotary member is transmitted to a stationary housing or the like through a plurality of thrust bearings. One thrust race of each bearing is secured to the relatively movable member and the other race of the bearing is fixed with respect to the relatively fixed member. The load imposed upon any one of the thrust bearing races should be predetermined in order to insure the provision of a suitable type and size bearing for the load which it must bear. However, the determination of the thrust load on a given bearing under these circumstances is extremely difficult due to the many factors of design and to the varying nature of the load imposed on the rotary member and to many other factors involved in the specific installation.

The present invention now provides improved means for individually apportioning the thrust load upon a plurality of bearings so that a predetermined proportion of the total thrust load will be imposed on each bearing. The present invention thus contemplates, in effect, the provision of a coupling between the bearings for accommodating the predetermined division of thrust loads between a plurality of bearings. In this manner, the thrust load which is to be imposed upon a given bearing may be determined prior to bearing installation, thereby preventing the failure of the bearing under load and obviating the necessity of carrying out the extremely complicated calculations heretofore necessary.

The means of the present invention are particularly adapted for employment in machine tools, such as routers and the like. The particular means of the present invention suitably include a generally cylindrical thrust collar confined between the stationary thrust race of a bearing and a stationary housing which journals the relatively rotatable member.

More particularly, the collar is in extended surface contact with a circularly arranged series of hemispherical rocker members, each seated in a saddle or cradle. The saddle or cradle is confined within the fixed housing for the rotary member. To apportion the load between two thrust bearings, each of the bearings is provided with a similar collar and each of the collars has a projection extending into contact with each rocker element of the composite rocker member so that the total thrust load on the rotary member is received by the rocker member through the medium of the collar. The total thrust transmitted to the rocker member by the collar is the total thrust load imposed on the bearings for the rotary member, while at the same time the rocker member transmits to the housing the load imposed thereon. The total force transmitted to the rocker member by any collar is directly proportional to the radial distance between the center line of the projection on the collar and the center line of rotation of the rocker member. Thus, the portion of the thrust load to be transmitted to the housing through each of the bearings is dependent upon and directly proportional to the radial distance between the center line of the projection on the collar and the center line of rotation of the rocker member.

It is, therefore, an important object of the present invention to provide an improved thrust load equalizing device for a plurality of thrust bearings, the device having a rocker member serving to apportion between a plurality of bearings the total thrust load imposed thereon.

Another object of the present invention is to provide a load equalizing device for a plurality of thrust bearings including a rocker member confined within a saddle and means operatively connecting each of the bearings with the rocker member for transmitting the thrust load from the bearings to the rocker member, said rocker member serving to apportion the total load on the bearings between the individual bearings.

Still another object of the present invention is to provide means for apportioning the total thrust load between a plurality of concentric thrust bearings, the means including cylindrical thrust collars for each of the bearings, and a rocker member in surface contact with the collars, the rocker member apportioning the total load between the bearings.

Other and further important objects of this invention will be apparent from the disclosures in the specification and the accompanying drawings.

On the drawings:

Figure 1 is a broken longitudinal axial sectional view with parts in elevation of the router spindle provided with a load equalizing device of the present invention;

Figure 2 is an enlarged fragmentary sectional view taken along the plane II—II of Figure 3 showing a series of hemispherical rocker members;

Figure 3 is an enlarged fragmentary sectional view, similar to Figure 1 and illustrating one form of the device of the present invention;

Figure 4 is an enlarged fragmentary sectional view similar to Figure 1 and illustrating a modified form of the device of the present invention.

As shown on the drawings:

Reference numeral 10 refers generally to a machine tool router including a housing 11 having an axial bore 12. A router spindle 13 is mounted in the bore 12 to extend axially therethrough.

The spindle 13 is rotatably journaled in the bore 12 by suitable means, to be hereinafter more fully described, the spindle 13 being axially bored as at 14 to receive therethrough an elongated tie bolt 15. A tool 16 is provided with a head 17 projecting beyond the spindle 13 and with a rearwardly facing generally frusto-conical end portion 18 seated in a correspondingly apertured collar or chuck 19. The tool 16 is retained in the check 19 by means of the tie bolt 15, which is threaded into the tool and is retained in the spindle by means of nuts 20 threaded against the other end of the spindle from that receiving the tool 16.

At the end of the spindle 13 facing the cutting tool head 17 is an annular shoulder 21 against which is press-fitted a sealing or retaining ring 22 having an L-shape cross-section. The ring 22 is rotatable with the spindle 13. Freely fitted within the ring 22 is a retaining ring 23. The ring 23 is secured to the stationary housing 11 by means of screws 24 of which one is illustrated. The spindle 13 has a generally stepped configuration formed by portions having progressively increasing diameters with annular shoulders 25 and 31 therebetween and spaced apart from one another in a predetermined relationship. Seated on the shoulder 25 of the spindle 13 is an inner race 26 of a group of concentric thrust bearings 27 for journaling the spindle 13 and the bore 12 of the stationary housing 11. The inner race 26 is secured to the spindle 13 and rotates therewith, while an outer race 28 remains stationary and is secured to the housing 11. Balls 29 are rotatable between the inner race 26 and the outer race 28.

A second group of concentric thrust bearings 30 are seated on the shoulder 31 for further journaling the spindle 13 and the bore 12 of the stationary housing 11. An inner race 32 is seated on the shoulder 31. The inner race 32 is secured to the spindle 13 and rotates therewith. An outer race 33 remains stationary.

Confined between the stationary outer thrust race 28 of the thrust bearing 27 and the stationary housing 11 is a generally cylindrical thrust collar 34. A similar thrust collar 35 is seated on the outer thrust race 33. The thrust collars 34 and 35 are rigid non-compressible coupling members.

The thrust collars 34 and 35 have projections 34a and 35a extending therefrom which are in surface contact with a rocker member 37. The rocker member 37, being of hemispherical shape, has a flat end portion in surface contact with the projections 34a and 35a. The rocker member 37 serves to apportion between the two series of bearings the total thrust load. The rocker member 37 is seated in a saddle or cradle 36 which is contained in the housing 11.

A series of concentric rocker elements, such as rocker member 37, form a composite rocker member. The rocker elements are spaced apart so as to afford pivotal movement to each rocker member within a cradle without having the rocker members binding. A projection from each circular collar engages each of the rocker members whereby each rocker member apportions the load between the respective bearings.

To apportion the load, each group of thrust bearings, such as 27 and 30, is provided with a thrust collar. Forces are transmitted from the thrust bearing 27 to the thrust collar 34 and further forces are transmitted from the thrust bearing 30 to the thrust collar 35. The thrust collar 34 and the thrust collar 35 contact a rocker member 37 so that the thrust load on the rotary member is transmitted to the rocker member 37 through the medium of the thrust collars 34 and 35. The total thrust load transmitted to the rocker member 37 by the collars is the total thrust load imposed on the bearings 27 and 30 from the rotary member 13. The rocker member 37 transmits to the housing 11 by way of the saddle 36 the total thrust load imposed thereon. The total thrust load transmitted to the rocker member by any collar is directly proportional to the radial distance between the center line of the projection on a collar and the center line of rotation of the rocker member. Thus, the portion of the thrust load to be transmitted to the housing through each of the bearings is dependent upon and directly proportional to the radial distance between the center line of the projection on the collar and the center line of rotation of the rocker member. Therefore, as shown in Figure 3, to equalize the thrust load for each bearing, the center line of the projection of each thrust collar must be an equal radial distance to the center line of the rotation of the rocker member 37.

In the modified form, as shown in Figure 4, the radial distances between the center of the projections 35a and 34a on the collars 35 and 34, respectively, and the center line of the rotation of the rocker member 37 are not equal and therefore the thrust load of each thrust bearing is proportional to the radial distance between the center line of the projection of the collar associated therewith and the center line of rotation of the rocker member.

A coolant or lubricating fluid is fed to the spindle assembly through an inlet 38 and the coolant passes therefrom into a passageway 39 and then through an outlet 40.

To further journal the spindle 13 in the bore 12 bearings 41 are provided. The bearings 41 are primarily rotational bearings. Springs 42 maintain the bearings 41 in fitted position. A sealing ring 43 is shown fitted around the decreased diameter portion of the spindle 13.

It will be understood that modifications and variations may be effected without departing from the scope of the novel concepts of the present invention.

I claim as my invention:

In a load equalizing device for thrust bearings, a plurality of thrust bearings, a plurality of coupling members having projections therefrom, each of said coupling members having a surface contact with a respective one of said thrust bearings for transmitting a thrust load therefrom, a housing having an annular shoulder for absorbing the thrust load, a saddle of ring shape having one annular end face bottomed against said housing shoulder and having in the other annular end face an annular recess, and a plurality of segmental cylindrical rocker members having cylindrical faces seated in said recess and extending generally radially of said saddle and having flat faces providing predetermined surface areas for contact with said respective projections for receiving a thrust load imparted thereto, the bottom of said recess and the faces of the rocker members seated therein having conforming segmental cylindrical portions to provide rocking movement therebetween whereby the thrust load for each of said bearings is proportional to the radial distance between the center line of said predetermined surface contact area and the center line of rotation of said rocker members.

ARTHUR W. BURKS.

REFERENCES CITED

The following references are of record in the file of this patent:

UNITED STATES PATENTS

| Number | Name | Date |
|---|---|---|
| 1,734,223 | Melott | Nov. 5, 1929 |
| 1,956,648 | Messinger | May 1, 1934 |

FOREIGN PATENTS

| Number | Country | Date |
|---|---|---|
| 274,401 | Germany | May 20, 1914 |